(12) United States Patent
Steiner et al.

(10) Patent No.: US 7,981,282 B2
(45) Date of Patent: Jul. 19, 2011

(54) AUTOMATIC SLURRY STRAINER

(75) Inventors: Carl A. Steiner, Erie, PA (US); Miguel A. Rendon, Erie, PA (US); Kerry K. Kerr, Albion, PA (US); Ricky L. Jackson, Union City, PA (US)

(73) Assignee: TM Industrial Supply, Inc., Erie, PA (US)

( * ) Notice: Subject to any disclaimer, the term of this patent is extended or adjusted under 35 U.S.C. 154(b) by 1119 days.

(21) Appl. No.: 11/789,709

(22) Filed: Apr. 25, 2007

(65) Prior Publication Data

US 2008/0023391 A1   Jan. 31, 2008

Related U.S. Application Data

(60) Provisional application No. 60/794,664, filed on Apr. 25, 2006.

(51) Int. Cl.
*B01D 33/00* (2006.01)
*B01D 33/06* (2006.01)
*B01D 33/11* (2006.01)
*B01D 33/76* (2006.01)
*B01D 35/16* (2006.01)

(52) U.S. Cl. ........ 210/157; 210/107; 210/158; 210/161; 210/383; 210/396; 210/397; 210/402; 210/433.1

(58) Field of Classification Search ........... 210/107, 210/157, 158, 161, 396, 397, 784, 402, 433.1, 210/383, 408
See application file for complete search history.

(56) References Cited

U.S. PATENT DOCUMENTS

| 842,602 | A | * | 1/1907 | Wurdack ............... 210/397 |
| 5,152,891 | A | | 10/1992 | Netkowicz et al. |
| 5,262,069 | A | * | 11/1993 | Kato ...................... 210/777 |
| 5,332,499 | A | | 7/1994 | Spencer |
| 5,622,625 | A | * | 4/1997 | Nagaoka ................ 210/232 |
| 2005/0126967 | A1 | * | 6/2005 | Berry et al. ............. 210/158 |

OTHER PUBLICATIONS

Hellan Fluid Strainers-A product of Cleveland Gear-Feb. 1985, hellansales@hellanstrainer.com (6 pages).

* cited by examiner

*Primary Examiner* — Duane Smith
*Assistant Examiner* — Paul J Durand
(74) *Attorney, Agent, or Firm* — The Webb Law Firm

(57) ABSTRACT

An automatic strainer assembly for straining a slurry comprises an inlet for receiving the slurry, a horizontally disposed strainer body in fluid communication with the inlet, and a rotatable strainer member received within the body having an inner surface and an outer surface. The strainer member defines a plurality of passageways for strained fluid to pass therethrough. A scraper is positioned substantially adjacent to and contacting the outer surface of the strainer member for removing material from the outer surface of the strainer member. A collection vessel is positioned substantially below the body for receiving material scraped from the outer surface of the strainer member. This collection vessel can include a transport member for returning this scraped material to an initial slurry supply for reprocessing thereof. An outlet is provided in fluid communication with the horizontal strainer body to expel the strained slurry.

18 Claims, 9 Drawing Sheets

AUTOMATIC SLURRY STRAINER

CROSS REFERENCE TO RELATED APPLICATIONS

The present application claims priority to U.S. Provisional Application No. 60/794,664, filed Apr. 25, 2006, which is hereby incorporated by reference in its entirety.

BACKGROUND OF THE INVENTION

1. Field of the Invention

This invention relates to a strainer and, more particularly, to an automatic horizontal strainer for the removal of solids or particles from a slurry, such as in the production of ethanol and other types of fluids.

2. Description of Related Art

In the gasoline industry, ethanol blends are quickly becoming the additive of choice in the production of oxygenated fuels in order to meet the ever-increasing environmental requirements regarding fuel emissions. Examples of ethanol sources include bagasse (forest residue), sawdust, wood waste, yard clippings, rice hulls, corn, soybean, sugar cane, and potatoes, with corn being one of the preferred sources of ethanol. In the manufacture of ethanol, straining of the solids or particles from the mash is a time-consuming effort. Essentially, solids or particles, such as corn solids, are filtered and removed from the fermented liquid by passing a slurry of solids and liquids past a basket-type strainer. Once the basket is filled with solids or particles, the basket must be manually removed and cleaned.

SUMMARY OF THE INVENTION

It is therefore an object of the invention to provide an automatic strainer assembly for use with slurries for straining fluid material and removing solid materials therefrom. It is another object of the invention to provide a strainer assembly for retrieving the solid materials and recycling/reusing these materials. It is yet another object of the invention to provide a strainer assembly having removable components to facilitate cleaning thereof. It is still yet another object of the invention to provide a strainer assembly having a timing mechanism for automatically cleaning out the solid material receptacle. It is another object of the invention to provide an automatic strainer assembly having ergonomically designed components which prevent trapping of solid material pieces in the assembly components and increased overall efficiency of the strainer assembly.

Accordingly, the present invention is directed to an automatic strainer assembly for straining a slurry. The strainer assembly comprises an inlet for receiving the slurry, a horizontally disposed strainer body in fluid communication with the inlet, and a rotatable strainer member received within the body having an inner surface and an outer surface. The strainer member defines a plurality of passageways for strained fluid to pass therethrough. A scraper is positioned substantially adjacent to the outer surface of the strainer member for removing material from the outer surface of the strainer member. A collection vessel is positioned substantially below the body for receiving material scraped from the outer surface of the strainer member. An outlet is provided in fluid communication with the horizontal strainer body to expel the strained slurry.

The present invention is also directed to a method for processing a slurry. The method comprises the steps of providing a processor for producing the slurry, feeding the slurry to an inlet of an automatic strainer assembly to strain the slurry, scraping the strained material from the strainer assembly, collecting the strained slurry from an outlet of the strainer assembly, and retrieving the scraped material from the strained slurry and transporting this material back to a predetermined location.

These and other features and characteristics of the present invention, as well as the methods of operation and functions of the related elements of structures and the combination of parts and economies of manufacture, will become more apparent upon consideration of the following description with reference to the accompanying drawings, all of which form a part of this specification, wherein like reference numerals designate corresponding parts in the various figures.

DESCRIPTION OF THE PREFERRED EMBODIMENT(S)

Figure 1A:
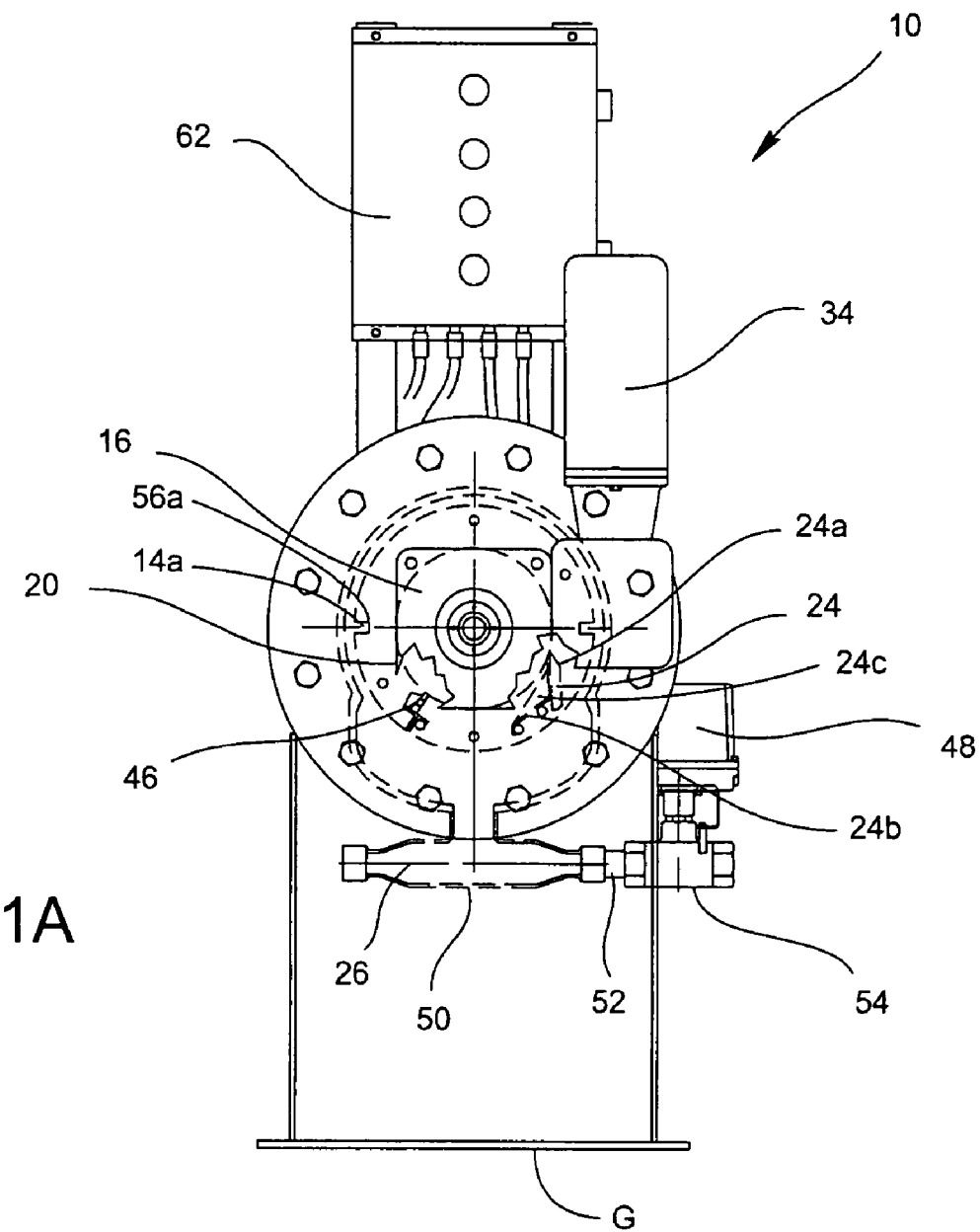
FIG. 1A shows a front elevational view of the strainer assembly according to the invention.
Figure 1B:
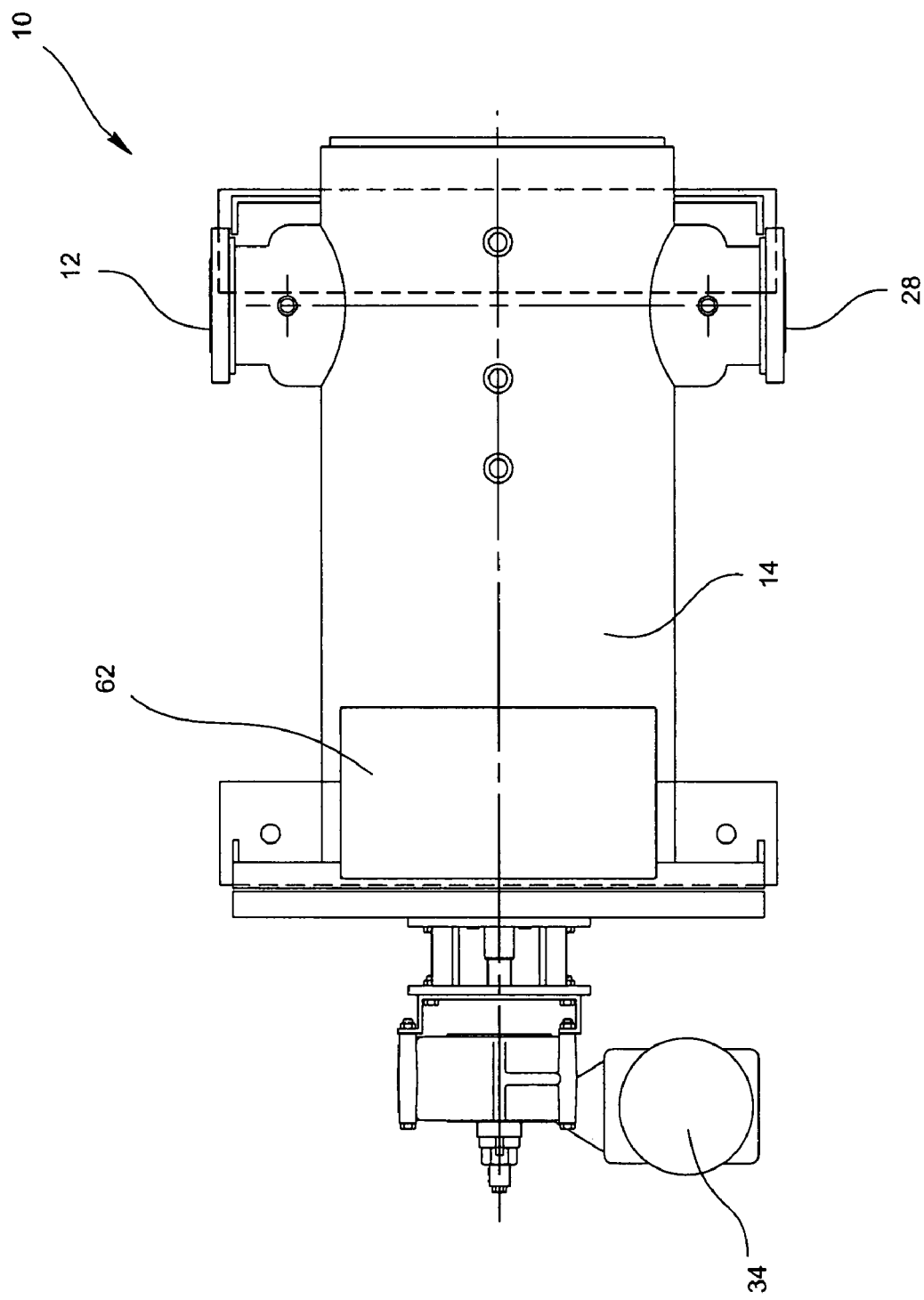
FIG. 1B shows a top plan view of the strainer of FIG. 1A.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

The strainer assembly of the invention is used primarily to remove solids or particles from a slurry. One particular use of the invention is in the production of ethanol utilizing organic material, such as, for example, corn, soybeans and sugar cane. It has been found that certain organic materials or solids, after fermentation, tend to stick to strainer screens, resulting in difficulty in removing the solids or particles from the strainer screen. The present invention can be used in other industries such as pulp and paper and wastewater, to name a few.

Figure 1C:
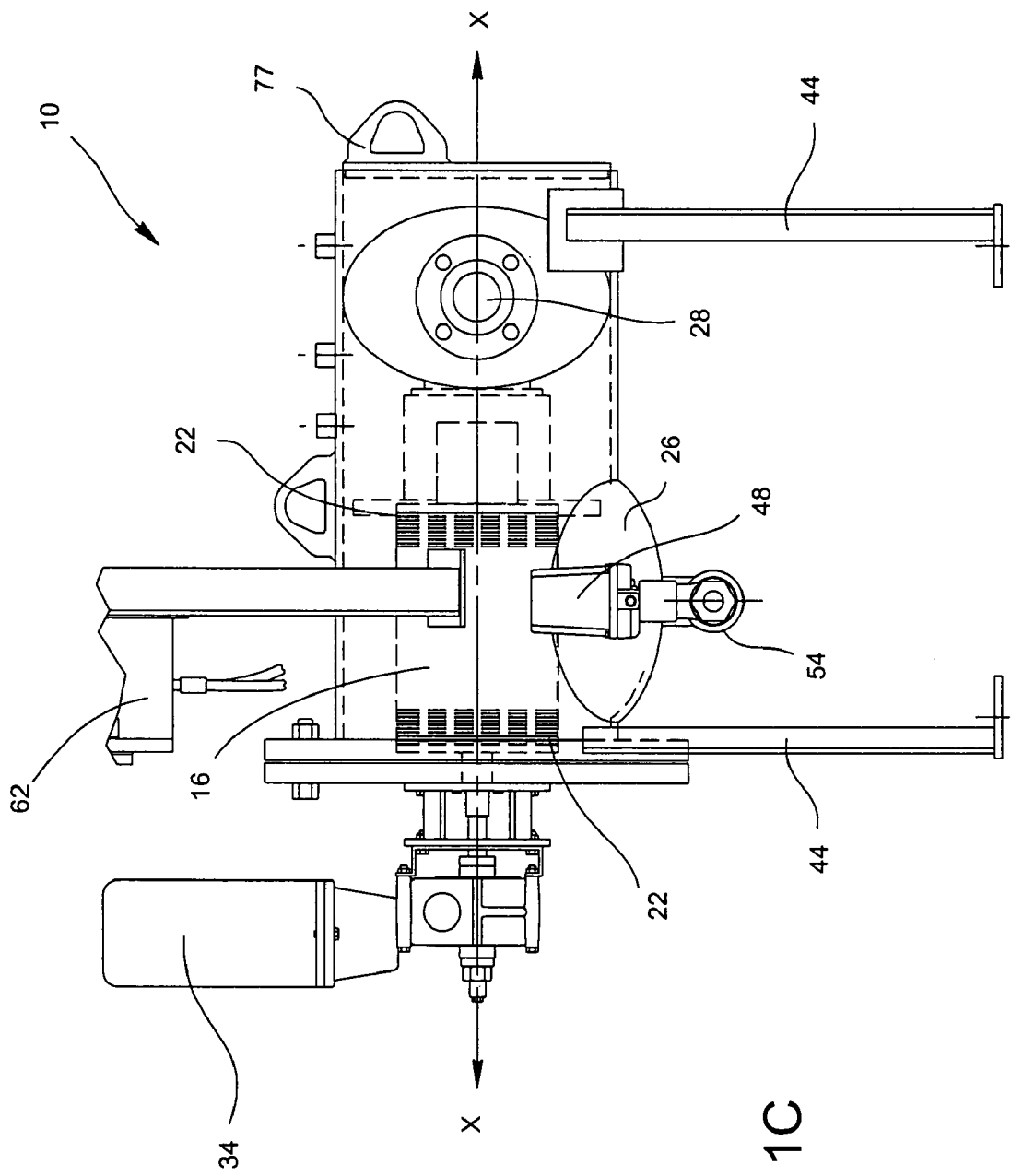
FIG. 1C shows a side elevational view of the strainer assembly of FIG. 1A.
Figure 2A:
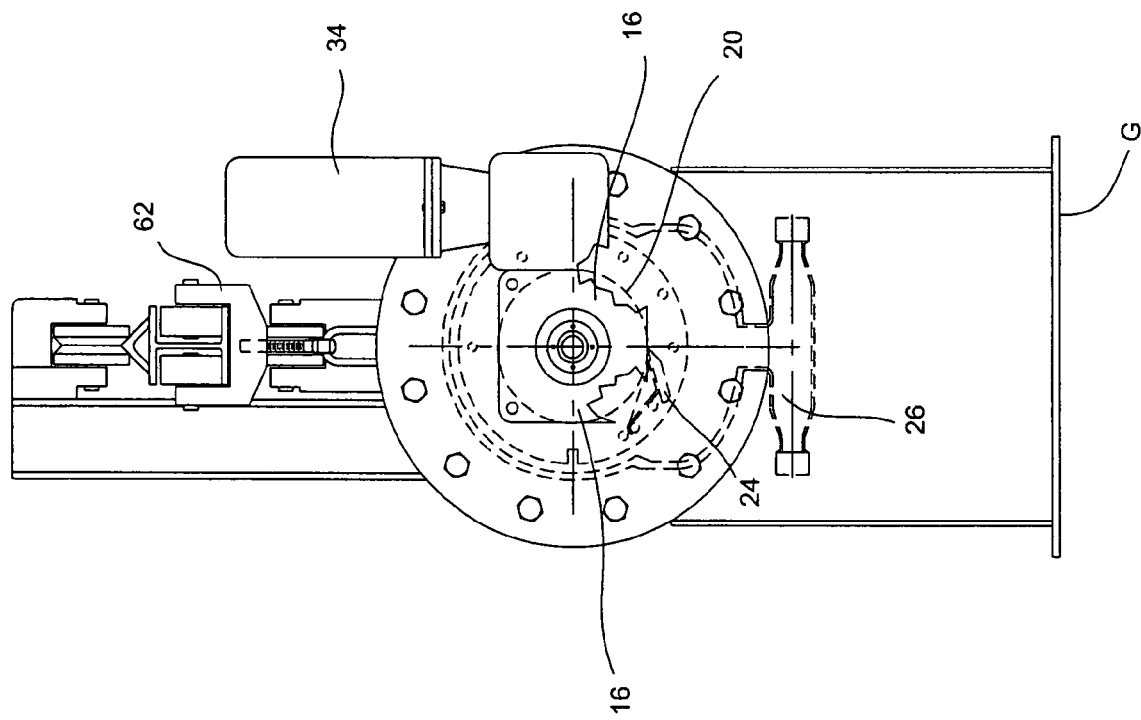
FIG. 2A shows a front elevational view of the strainer assembly of the invention wherein the scraper is positioned at an alternative location.
Figure 2B:
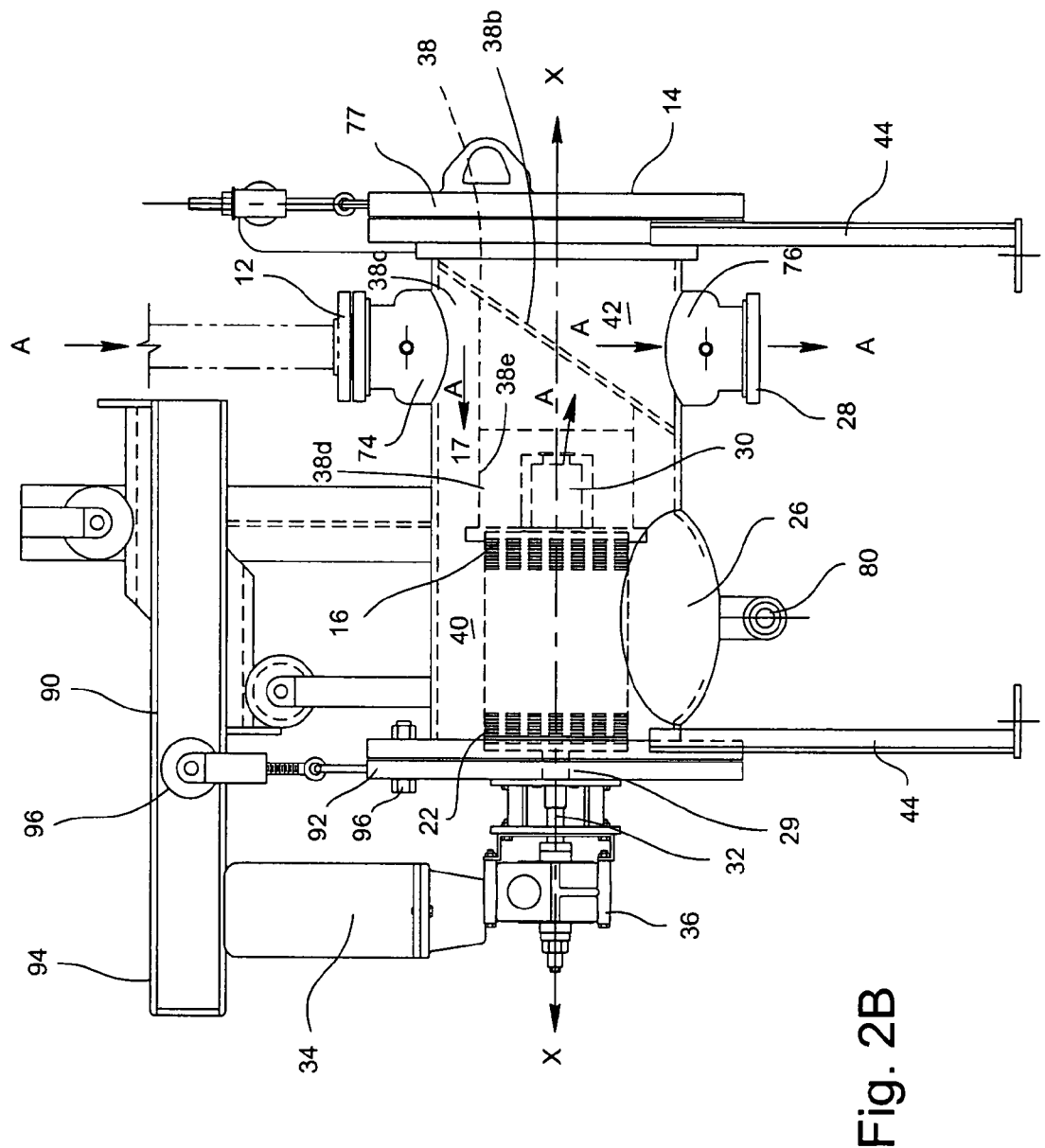
FIG. 2B shows a side elevational view of the strainer assembly of FIG. 2A.
Figure 3:
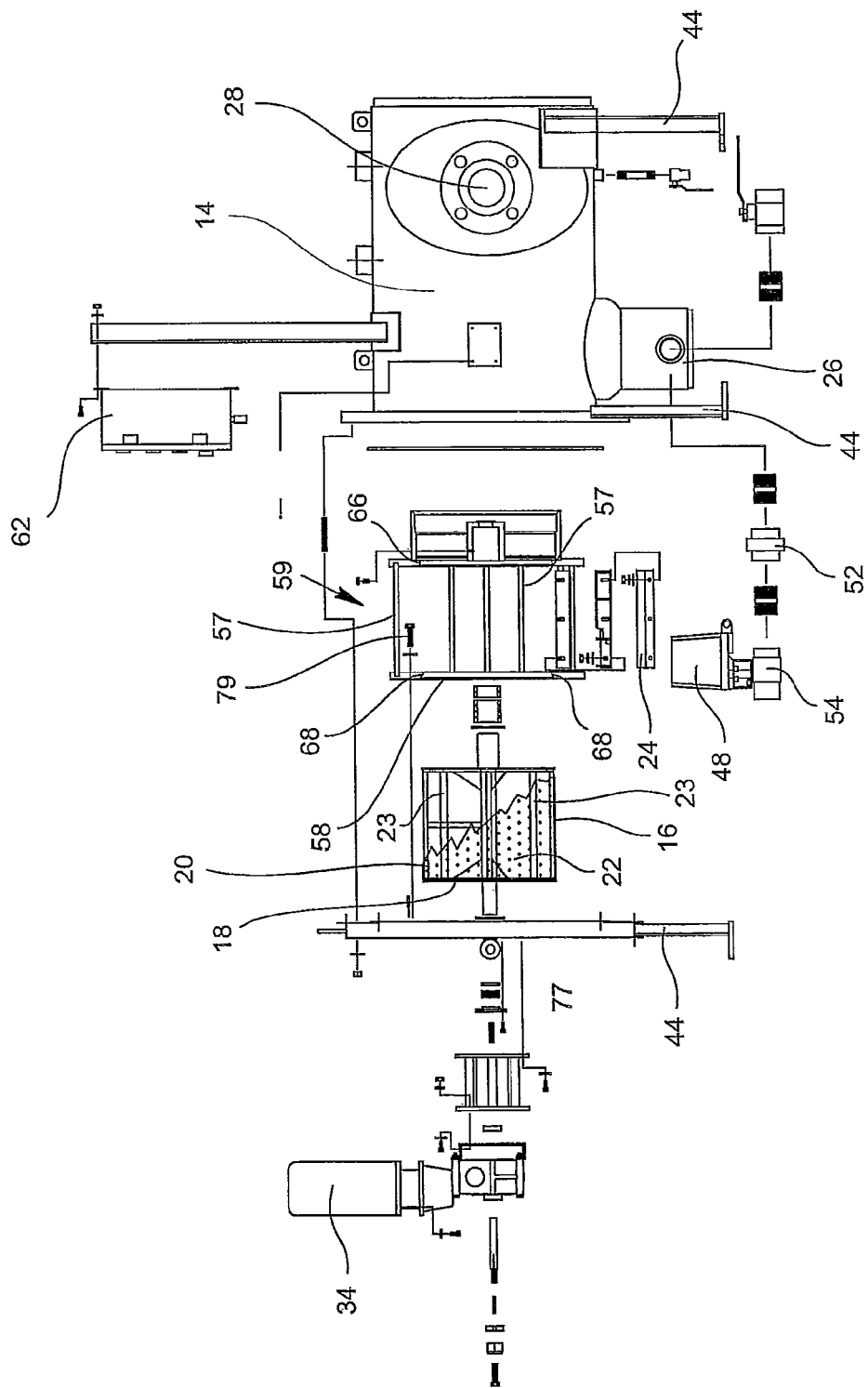
FIG. 3 shows an exploded side elevational view of the strainer assembly of the invention.

Reference is now made to FIGS. 1A-1C, 2A-2B and 3, which show the strainer assembly, generally indicated as 10, of the invention. The strainer assembly 10 includes an inlet 12 for receiving the slurry, a horizontally disposed strainer body 14 relative to a ground level G in fluid communication with the inlet 12, and a rotatable strainer member 16 received within the body 14. The strainer member 16 has an inner surface 18 and an outer surface 20. The strainer member 16 is preferably a screen-type strainer such as a perforated or wedge wire screen, which defines a plurality of passageways 22 for strained fluid to pass therethrough. As shown in FIG. 3, at least one stationary bar 23 is located within the strainer member 16. Preferably a plurality of stationary bars 23 are positioned adjacent the inner surface 18 of the strainer member 16. A scraper 24 is positioned substantially adjacent to and contacting the outer surface 20 of the strainer member 16 for removing material from the outer surface of the strainer member 16. A collection vessel 26 is positioned substantially below the body 14 for receiving material scraped from the outer surface 20 of the strainer member 16. An outlet 28 is provided in fluid communication with the horizontal strainer body 14 to expel the strained slurry.

As illustrated in FIGS. 1C and 2B, the strainer assembly 10 and strainer body 14 are horizontally supported by legs 44. The strainer member 16 is rotatably attached to an interior 17 of the strainer body 14. The strainer member 16 is adapted to rotate about a longitudinal axis X and is rotatably secured with bearings 29, 30 and a drive shaft 32 is drivingly coupled to a motor 34 and a drive 36 to rotate the strainer member 16. A divider plate 38b is provided within the strainer body 14 for separating an inlet portion 40 and an outlet portion 42 of the strainer interior 17. The divider plate 38 includes a center passageway 38b wherein the plate 38 forms an inlet annulus 38a. The annulus 38a also is defined by an inner surface of the strainer body 14 and a divider tube 38d. An inner surface 38e of the divider tube 38d is in fluid communication with the interior of the strainer member and the outlet 28.

In operation, the strainer member 16 is rotated by motor 34 about the X axis. A slurry, such as corn mash, flows from the inlet 12 through the inlet annulus 38a to the strainer member 16, is strained through passageways 22 of the strainer member 16, and then the strained fluid exits through the divider tube 38d, the divider plate center passageway 38b and, through outlet 28, as shown by arrows A in FIG. 2B. As can be appreciated, the divider plate 38 separates the inlet 12 from the outlet 28, thereby causing the slurry to pass through the strainer member 16. A scraper 24, as shown in FIGS. 1A and 2A, is provided adjacent to and in contact with the outer surface 20 of the strainer member 16 for removing any solid material remaining or sticking to this outer surface 20. The collection vessel 26 collects this solid material as it is scraped from the strainer member 16.

The scraper 24 may be located at two different locations with respect to the strainer member 16. As shown in FIG. 1A, scraper 24 is located to one side of the strainer member 16 prior to the collection vessel 26 with respect to a clockwise rotation of the strainer member 16. As shown in FIG. 1A, preferably, the scraper 24 which includes a scraper blade 24a and scraper holder 24b, is positioned to a side of the strainer member 16 between a 90° and 180° angle with respect to a center point of the horizontally disposed strainer member 16 as the strainer member 16 rotates about the horizontal axis X. This particular design allows the scraped material to fall into the collection vessel 26 via gravity as the strainer member 16 rotates. Also, the scraper blade 24a contacts the outer surface 20 and a downwardly sloping surface passageway 24c is defined between outer surface 20, blade 24a and scraper holder 24b to direct any accumulated material located in the passageway 24c into the collection vessel 26.

According to the design illustrated in FIG. 2A, the scraper 24 can be alternatively positioned at a lowermost portion of the strainer member 16 between the strainer member 16 and the collection vessel 26.

The orientation of the scraper 24 can be manually adjustable with respect to the outer surface 20 of the strainer member to vary the scraping force applied to the material being removed therefrom. The distance between the scraper 24 and this outer surface 20 can also be varied. Additionally, the scraper 24 preferably includes a sharp edge placed in contact with the outer surface 20 of the strainer member 16 for cutting any solid particles caught within the passageways 22 of the strainer member. The scraper 24 extends along the complete length of the outer surface 20. Cutting of the solid particles will allow these particles to fall into the collection vessel 26 and reduce the time-consuming process of individually pushing these particles through the passageways 22 with a dowel or any other well-known device. A brush 46 may be provided adjacent to the outer surface 20 of the strainer member 16. This brush 46 is preferably located after the strainer member 16 has rotated past the collection vessel 26 in order to loosen any material remaining on the strainer member 16.

In order to further avoid trapping of particles within the passageways 22 of the strainer member 16, it has been found that passageways 22 having a diameter of approximately $15/64$ of an inch works particularly well for corn mash slurries, however the passageway diameter may be optimized for a particular strainer assembly according to the characteristics/particle size of the slurry being processed.

As illustrated in FIGS. 1A and 3, the collection vessel 26 tapers down into a collector 50 that is fluidly coupled to an eccentric reducer 52 and to piping 54 so that the lowest portions of the collector 50, reducer 52 and piping 54 are aligned with each other to prevent collection of debris. At least one blow-off valve 48, including an actuator, is in fluid communication with the piping 54 for flushing out the material from the collection vessel 26. A timing arrangement may also be provided for automatically actuating this blow-off valve 48.

Controls 62 are provided that can cause the activation of motor 34. Also, the controls 62 include the timing arrangement for periodically opening and closing the blow-off valve 48.

Figure 4:
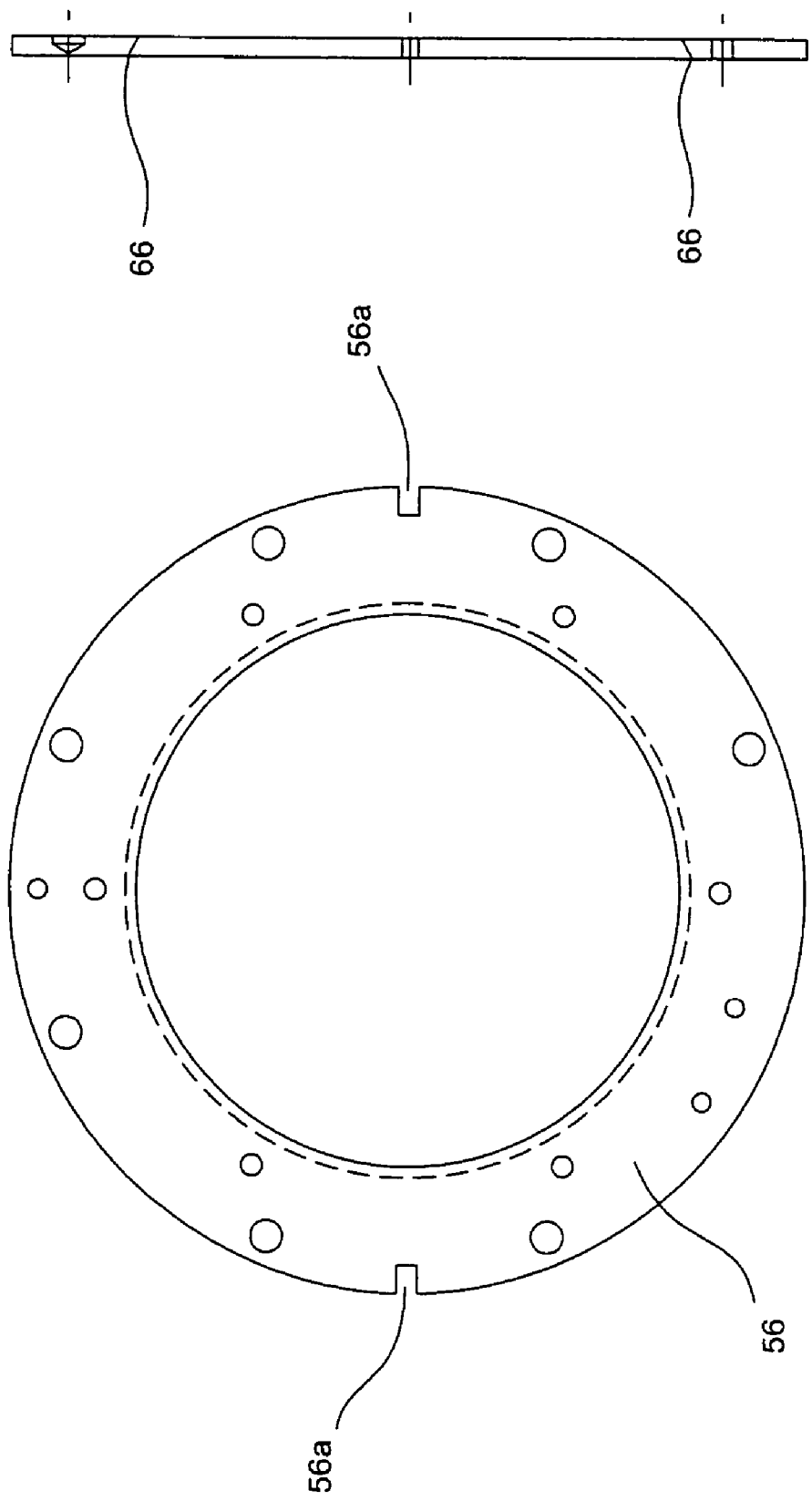
FIGS. 4A and 4B show a front and side view, respectively, of a front plate for supporting the strainer member.
Figure 5:
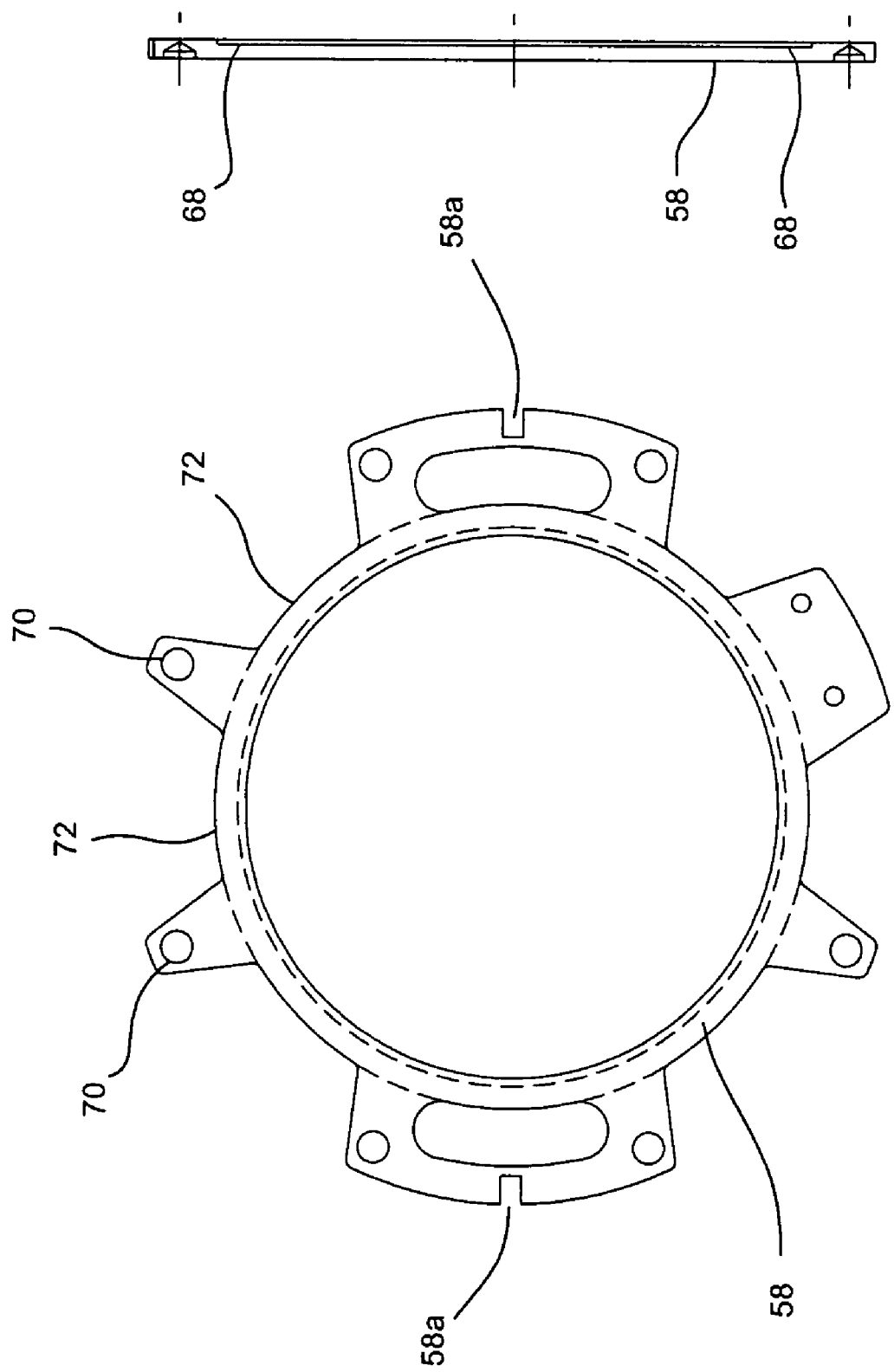
FIGS. 5A and 5B show a front and side view, respectively, of the back plate for supporting the strainer member.

The strainer assembly also includes several ergonomically designed components which improve the efficiency of the strainer assembly. The strainer member 16 is supported by a front plate or ring 56, as illustrated in FIGS. 4A and 4B, and a back plate or ring 58, as illustrated in FIGS. 5A and 5B. A slight space is present between the strainer member 16 and the front and back plates 56 and 58. It has been found that during the straining process, particles can become trapped or lodged in this space. These trapped particles can slow down or even stop the rotation of the strainer member 16. When this occurs, the straining process must be stopped and the strainer body 14 disassembled to remove the trapped particles. In order to overcome this problem, the invention utilizes front and back plates 56, 58 having beveled edge portions 66 and 68 for expelling the particles outwardly with respect to the strainer member 16. Additionally, the back plate 58 can comprise a scalloped surface having protrusions 70 and indentations 72 for facilitating flow of the slurry from the inlet 12 toward the strainer member 16.

Another ergonomic design of the invention is the provision of graduated flange portions 74, 76 for the inlet 12 and outlet 28. This design allows for progressive funneling of the slurry through the strainer member 16 and reduces head-loss across the strainer assembly 10. In other words, the inlet 12 converges in diameter into the strainer body 14 and the outlet 28 diverges in diameter from the strainer body 14. Also, provided is a track assembly 90 coupled to the end flange 92. The bearing 29 and strainer member 16 are coupled to the end flange 92. The track assembly includes a track 94 and a wheel 96 coacting with the track 94 and end flange 92. In operation, when the strainer member 16 is to be inspected, the respective fasteners 96 holding end flange 92 in place are moved in the X direction. This in turn permits the strainer member to be removed from the interior of the strainer body 14 so that the strainer member 16 and other strainer components may be inspected. The process is reversed to assemble the strainer.

As shown in FIG. 3, front plate 56 and back plate 58 are welded to rails 57 to form a cage member, generally illustrated as 59. The rotatable strainer member 16 is slid into cage member 59, then cage member 59, containing strainer member 16, is slid into strainer body 14. Guide rails 14a, as shown in FIG. 1A, are provided in the interior of the strainer body 14. Front plate 56 and back plate 58 are provided with notches 56a and 58a, as shown in FIGS. 4A and 5A, which slide along these guide rails 14a during assembly. Cover 77 is then attached to the strainer body 14 by a well-known member such as a bolt 79. This design allows the cover to be removed and the strainer member 16 to be easily pulled out of the strainer body 14 for cleaning by an external water source.

Figure 6:
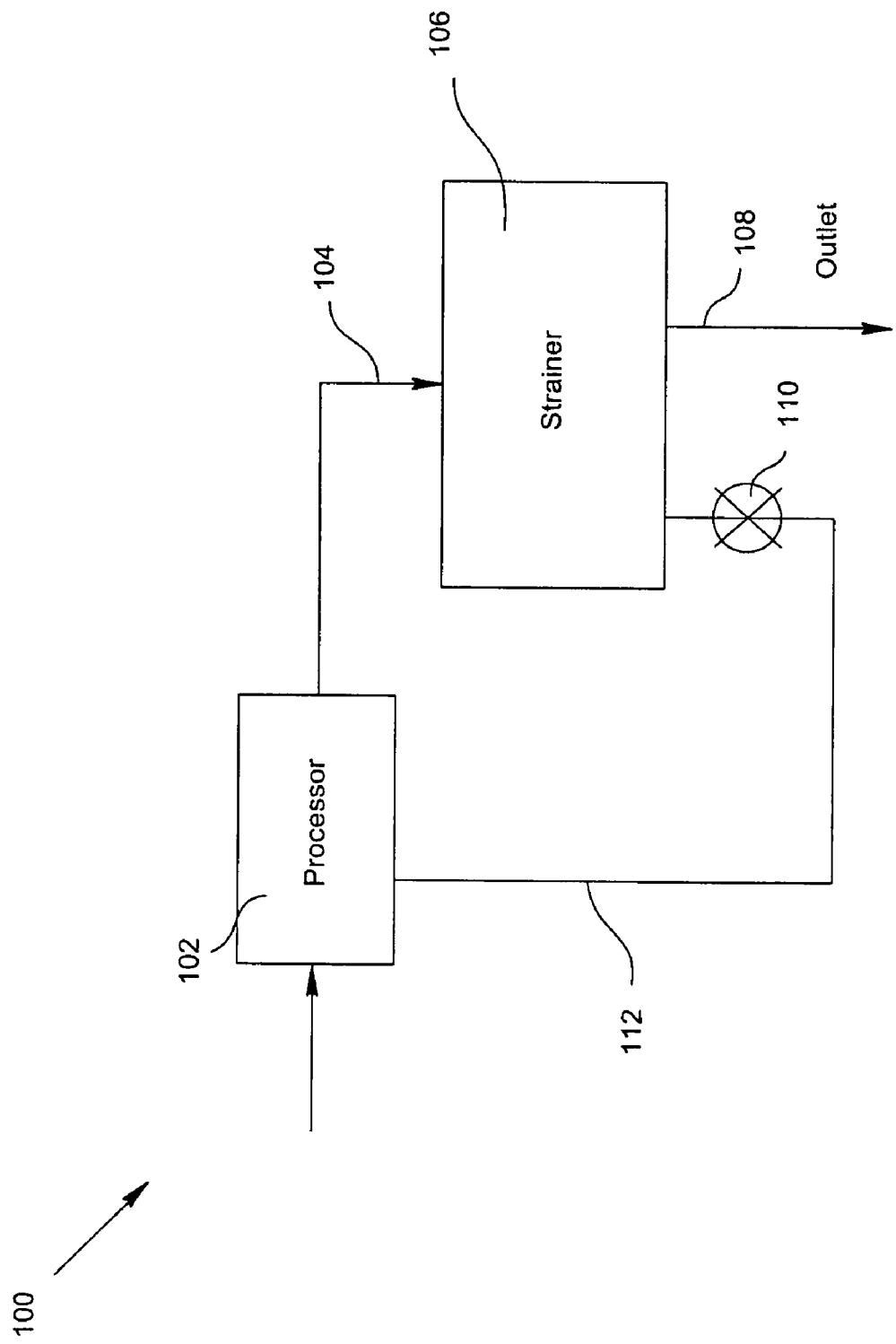
FIG. 6 shows a block diagram showing the recycling method of the invention.

The collection vessel 26 further includes a transport member 80 for removing the material from the collection vessel 26 and redirecting the material to a slurry preparation device. As illustrated in FIG. 6, the present invention provides for a method of processing a slurry, generally indicated as 100. The method includes the steps of providing a processor 102 for producing the slurry and feeding the slurry to an inlet 104 of an automatic strainer assembly 106. The strainer assembly 106 can be the strainer assembly 10, as discussed in detail above, or any other type of strainer assembly. This strainer assembly 106 then strains the fluid from the slurry and sends this fluid to an outlet 108. The method further includes the steps of scraping the strained material from the strainer assembly 106, retrieving the scraped material from the strained slurry 110 and transporting this material 112 back to a predetermined location such as the slurry processor 102 for recycling thereof or a disposal location.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of this description. For example, it is to be understood that the present invention contemplates that, to the extent possible, one or more features of any embodiment can be combined with one or more features of any other embodiment.

The invention claimed is:

1. An automatic strainer assembly for straining a slurry, said strainer assembly comprising:
    (a) an inlet for receiving such slurry;
    (b) a horizontally disposed strainer body in fluid communication with said inlet;
    (c) a rotatable strainer member received within said body having an inner surface and an outer surface, said strainer defining a plurality of passageways for strained fluid to pass therethrough;
    (d) a scraper positioned substantially adjacent to said outer surface of said strainer member for removing material from said outer surface of the strainer member;
    (e) a collection vessel positioned substantially below said body for receiving material scraped from said outer surface of said strainer member; and
    (f) an outlet for expelling the strained slurry in fluid communication with said horizontal strainer body; and
    (g) a frame comprising a pair of plates positioned on either end of said strainer member for supporting said strainer member, each of said plates including beveled edge portions for expelling any trapped material.

2. The strainer assembly of claim 1 wherein said scraper is located to one side of said strainer member prior to said collection vessel with respect to rotation of said strainer member, such that as said strainer member rotates, said scraper is adapted to remove and/or cut the material from said strainer member prior to rotation of said strainer member past said collection vessel, allowing the material to fall into said collection vessel via gravity.

3. The strainer assembly of claim 1 wherein said scraper is positioned at a lowermost portion of said strainer member between said strainer member and said collection vessel.

4. The strainer assembly of claim 1 wherein said scraper includes a sharp edge for cutting the solid particles caught within the passageways of said strainer member.

5. The strainer assembly of claim 1 including a brush located adjacent to said strainer member.

6. The strainer assembly of claim 1 wherein said collection vessel includes a recycle transport member for removing the material and redirecting the material to a slurry preparation device.

7. The strainer assembly of claim 6 wherein said collection vessel includes at least one blow-off valve for flushing out the material from said collection vessel and a timing arrangement for controlling actuation of said at least one blow-off valve.

8. The strainer assembly of claim 1 wherein said inlet and said outlet include graduated flanged portions to allow for progressive funneling of said slurry through said strainer member.

9. The strainer assembly of claim 1 wherein one of said plates comprises a scalloped surface for facilitating flow of the slurry from the inlet toward the strainer member.

10. The strainer assembly of claim 1 including a removable cover and an external water source for cleansing said strainer member.

11. The strainer assembly of claim 1 wherein the orientation of said scraper is manually adjustable with respect to said strainer member.

12. The strainer assembly of claim 1 wherein said strainer member includes at least one stationary bar located therein.

13. The strainer assembly of claim 12 wherein said at least one stationary bar includes a plurality of bars positioned adjacent said inner surface of said strainer.

14. A system for processing a slurry, said system comprising:
    (a) a supply of slurry product;
    (b) an automatic strainer assembly for receiving said slurry product, said strainer assembly comprising:
        (i) an inlet for receiving said slurry;
        (ii) a horizontally disposed strainer body in fluid communication with said inlet;
        (iii) a rotatable strainer member received within said body having an inner and an outer surface, said strainer defining a plurality of passageways for strained fluid to pass therethrough;
        (iv) a scraper positioned substantially adjacent to and contacting said outer surface of said strainer member;

(v) a collection vessel positioned substantially below said body for receiving said material scraped from said outer surface of said strainer member;

(vi) an outlet for expelling said strained slurry, said outlet being in fluid communication with said horizontal strainer body; and (vii) a front plate and a back plate for supporting said strainer member wherein said back plate includes a scalloped surface for facilitating flow of the slurry toward the strainer member and each of said front and back plates include beveled edge portions extending outwardly with respect to said strainer member; and (c) a transport line for transporting said scraped material from said collection vessel to said supply of said slurry product.

15. The system of claim 14 wherein said scraper is positioned to a side of the strainer member between a 90° and 180° angle with respect to a center point of said horizontally disposed strainer member as said strainer member rotates about a horizontal axis such that said scraped and/or cut material falls into said collection vessel via gravity.

16. The system of claim 14 wherein said inlet and said outlet include graduated flanged portions to allow for progressive funneling of said slurry through said strainer member.

17. The system of claim 14 including at least one stationary bar located within said strainer member.

18. The system of claim 17 wherein said at least one stationary bar includes a plurality of bars positioned adjacent said inner surface of said strainer member.

* * * * *

UNITED STATES PATENT AND TRADEMARK OFFICE
CERTIFICATE OF CORRECTION

Page 1 of 1

PATENT NO.         : 7,981,282 B2
APPLICATION NO.    : 11/789709
DATED              : July 19, 2011
INVENTOR(S)        : Carl A. Steiner et al.

It is certified that error appears in the above-identified patent and that said Letters Patent is hereby corrected as shown below:

Column 5, Line 63, Claim 1, after "strainer" insert -- member --

Column 6, Line 53, Claim 13, after "strainer" insert -- member --

Signed and Sealed this
Eighth Day of November, 2011

David J. Kappos
*Director of the United States Patent and Trademark Office*